United States Patent
Aurongzeb et al.

(10) Patent No.: US 10,860,276 B2
(45) Date of Patent: Dec. 8, 2020

(54) PORTABLE INFORMATION HANDLING SYSTEM HINGE DISPLAY

(71) Applicant: Dell Products L.P., Round Rock, TX (US)

(72) Inventors: Deeder M. Aurongzeb, Austin, TX (US); Mohammed K. Hijazi, Austin, TX (US); Vinh Xuan Bui, Round Rock, TX (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/260,426

(22) Filed: Jan. 29, 2019

(65) Prior Publication Data
US 2020/0241827 A1  Jul. 30, 2020

(51) Int. Cl.
G06F 3/14 (2006.01)
G06F 1/16 (2006.01)
G09G 3/20 (2006.01)
G06F 3/041 (2006.01)
G09G 3/3208 (2016.01)
G09G 3/36 (2006.01)
G06F 3/0485 (2013.01)

(52) U.S. Cl.
CPC .......... *G06F 3/1446* (2013.01); *G06F 1/1616* (2013.01); *G06F 1/1647* (2013.01); *G06F 1/1681* (2013.01); *G06F 3/0412* (2013.01); *G09G 3/2096* (2013.01); *G06F 1/1662* (2013.01); *G06F 3/0485* (2013.01); *G09G 3/3208* (2013.01); *G09G 3/36* (2013.01); *G09G 2354/00* (2013.01); *G09G 2380/02* (2013.01)

(58) Field of Classification Search
CPC .... G06F 3/1446; G06F 3/0412; G06F 3/0485; G06F 1/1616; G06F 1/1647; G06F 1/1681; G09G 3/2096; G09G 3/3208; G09G 3/36
See application file for complete search history.

(56) References Cited

U.S. PATENT DOCUMENTS

| | | | | |
|---|---|---|---|---|
| 6,073,187 A | * | 6/2000 | Jacobs | G06F 1/1616 361/679.27 |
| 9,367,151 B2 | | 6/2016 | McKillop et al. | |
| 2001/0016508 A1 | * | 8/2001 | Kido | G06F 1/1616 455/575.3 |
| 2002/0133761 A1 | * | 9/2002 | Numano | G06F 1/1677 714/57 |
| 2003/0119562 A1 | * | 6/2003 | Kokubo | H04M 1/72522 455/566 |

(Continued)

FOREIGN PATENT DOCUMENTS

JP   2002538520 A   1/2011
JP   2011018085 A   1/2011

*Primary Examiner* — Ariel A Balaoing
(74) *Attorney, Agent, or Firm* — Zagorin Cave LLP; Robert W. Holland (57) ABSTRACT

A portable information handling system having a barrel hinge with a cylindrical surface includes a display film disposed over the cylindrical surface and configured to present a selected of plural preset user interfaces or an extended operating system user interface based upon a sensed context. In one example embodiment, user interfaces presented at the hinge display include a selected of gaming, task and leisure user interfaces based upon sensed context.

9 Claims, 6 Drawing Sheets

(56) References Cited

U.S. PATENT DOCUMENTS

| | | | |
|---|---|---|---|
| 2008/0235527 A1* | 9/2008 | Heller | G06F 1/3203 713/320 |
| 2011/0080342 A1* | 4/2011 | Haren | G06F 3/1446 345/163 |
| 2012/0194448 A1* | 8/2012 | Rothkopf | B60R 11/0252 345/173 |
| 2016/0077550 A1* | 3/2016 | Zhang | G06F 1/1643 715/765 |
| 2018/0217668 A1 | 8/2018 | Ligtenberg et al. | |

\* cited by examiner

PORTABLE INFORMATION HANDLING SYSTEM HINGE DISPLAY

BACKGROUND OF THE INVENTION

Field of the Invention

The present invention relates in general to the field of portable information handling systems, and more particularly to a portable information handling system hinge display.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally process information in a portable housing that integrates processing components, a power supply and a display to support end user interactions without peripheral devices or external cable connections. One common configuration is that a display is integrated in a lid housing and rotationally coupled to a main housing that includes a keyboard. To interact with the information handling system, an end user rotates the lid and main housing to a perpendicular relationship, often referred to as a clamshell mode, so that the keyboard rests parallel to a support surface and the main housing holds the display in the lid housing at a viewing position over the keyboard. When the portable information handling system is not in use, the lid housing folds over the main housing in a closed mode for improved portability.

Generally, in the closed mode a portable information handling system is not configured to interact with an end user since the display and keyboard are hidden. Typically, the portable information handling system enters a reduced power state in the closed mode, such as by powering down the main processor and placing the other components in an off or other reduced power state. End user's tend to set aside portable information handling systems in the closed mode due to the lack of input or output capabilities, however, the power down state some components may continue to remain available. For example, an embedded controller that manages power at the information handling system typically remains available to process information with minimal energy consumption. An embedded controller is often used to control power rails that provide power to hardware components, such as audio players that play music and wireless networking components that communicate through wireless signals, such as WiFi. Generally, portable information handling systems that rotate housing portions to a closed position do not include input and output devices to access embedded controller functions when the housing is in the closed mode. Instead, the end user expectation is to open the housing to interact through the integrated keyboard and display.

SUMMARY OF THE INVENTION

Therefore, a need has arisen for a system and method which presents visual images for an end user with a housing rotated to a closed mode.

In accordance with the present invention, a system and method are provided which substantially reduce the disadvantages and problems associated with previous methods and systems for presenting visual images at a portable information handling system. A hinge display couples over a barrel hinge central cylinder and interfaces with an embedded controller to selectively present preset user interfaces based upon a context, such as a power state and housing rotational orientation of a portable information handling system.

More specifically, a portable information handling system process information with processing components disposed in a main housing, such as a CPU that executes an operating system, and presents information as visual images at a display integrated in a lid housing. The main housing rotationally couples to the lid housing with a hinge assembly that couples a central cylinder of the main housing between hinge ends coupled at opposing sides of the lid housing. A flexible display, such as an organic LCD or OLED film, couples over the hinge cylinder and interfaces with the processing components to present visual images over the hinge. Preset user interfaces presented by the hinge display provide information to an end user based upon a context at the portable information handling system, such as the power state of the main processor and the state of the housings as closed or open. If the main processor and operating system power down, the hinge display has a preset user interface selected by an embedded controller that provides information of interest to the end user, such as based upon the end user's context for interacting with the portable information handling system in a gaming, task or leisure mode. The hinge display flexes around the hinge assembly cylinder so that visual images may be presented with the housings in a closed or open mode. If the main processor and operating system are operational, a driver of the operating system may present visual images at the hinged display as an extended display that enhances end user interactions through a main display.

The present invention provides a number of important technical advantages. One example of an important technical advantage is that a portable information handling system presents visual images at a hinge display that enhances end user interactions with the system powered up or powered down, and with the system housing in a closed or open mode. Preset user interfaces are stored in flash memory and activated by an embedded controller to present an end user with information in a powered down and/or closed state, such as to present information about time of day, received messages, appointments or gaming events. In a normal operating system, the hinge display becomes an extended display of an operating system that enhances end user interactions and provides a convenient interaction medium for an end user that helps to avoid disruptions to the content presented at a main display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system presents visual images at a display film folded over a barrel hinge cylindrical shape. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
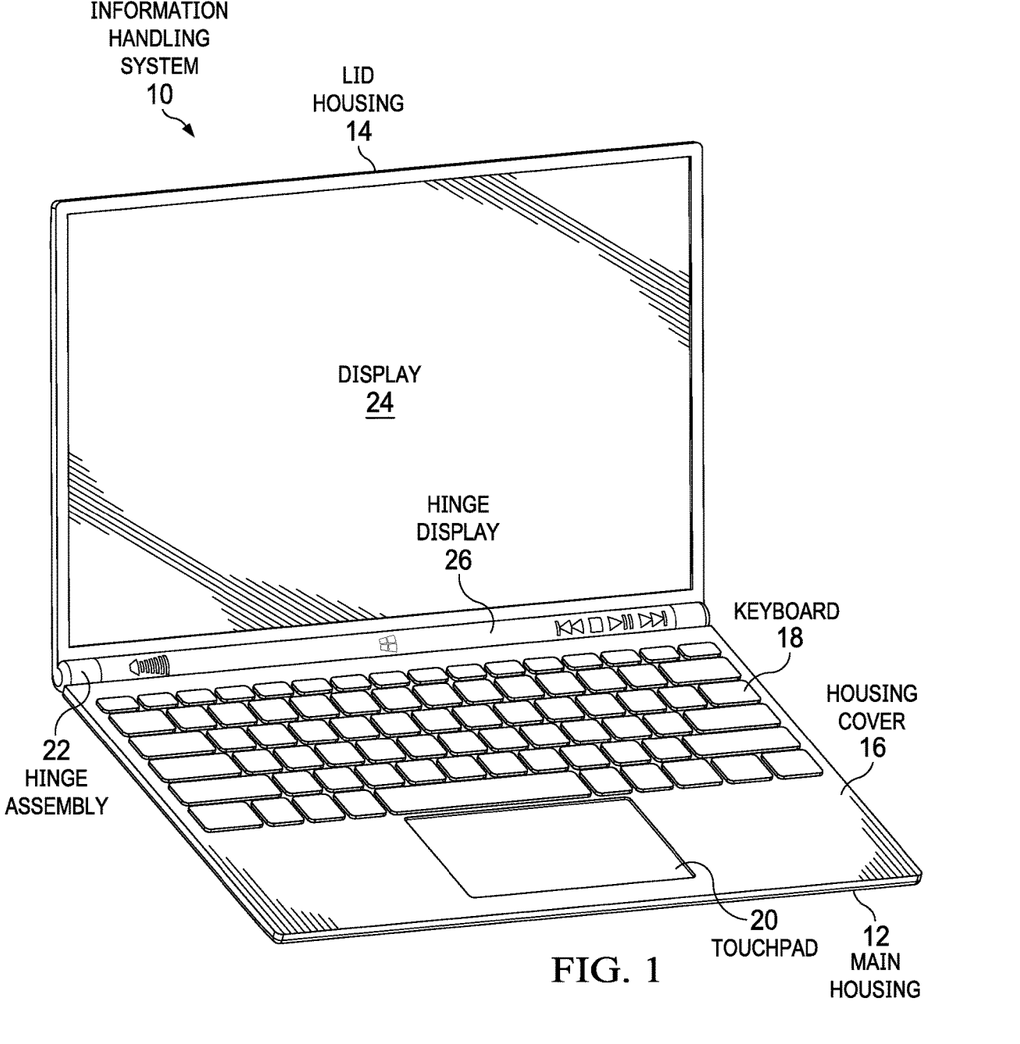
FIG. 1 depicts an upper perspective view of a portable information handling system configured with a hinge display.

Referring now to FIG. 1, an upper perspective view depicts a portable information handling system 10 configured with a hinge display 26. Portable information handling system 10 has a main housing 12 rotationally coupled with a lid housing 14 by a hinge assembly 22 to rotate between a closed position and various open positions, such as the clamshell position shown in the example embodiment having a substantially perpendicular alignment of main housing 12 and lid housing 14. A keyboard 18 rests on a housing cover 16 of main housing 12 to accept keyed inputs by an end user. A touchpad 20 rests on housing cover 16 to accept touch inputs that control a cursor and provide other interactions. A display 24 integrates in lid housing 14 and interfaces with processing components disposed in main housing 12 to present information as visual images. In one alternative embodiment, the processing components may be included in lid housing 14 to support separate operations as a tablet information handling system when separated from main housing 12.

A hinge display 26 couples over hinge assembly 22 to present visual information that supplements presentation of visual information at display 24. For example, when information handling system 10 is in a reduced power state, such as an S3 or S4 standby state that has a central processing unit powered down, hinge display 26 presents preset user interfaces with basic operation information, and when the central processing unit is operational, hinge display 26 presents an extended user interface that enhances end user interactions, such as by supplementing controls available to an operating system. Hinge display 26 is, for example, a flexible organic liquid crystal display (OLCD) film that folds over hinge assembly 22, such as is available from FlexEnable. Alternatively, hinge display 26 may be an organic light emitting diode (OLED) film or a conventional liquid crystal display (LCD) film formed to fit over the curved shape of hinge assembly 22. LCD type of display films have a backlight in hinge assembly 22 to illuminate the visual image. Hinge display 26 may integrate a touch detection surface, such as a capacitive touch detection sensor or pressure touch detection sensor, that provides a high resolution or a low resolution touch location input. In particular, when hinge display 26 presents a preset user interface with the information handling system in a reduced power state, low resolution touch detection provides adequate precision while reducing power consumption.

In various embodiments, hinge display 26 presents a user interface selected based upon the open or closed state of main housing 12 and lid housing 14 and context sensed proximate information handling system 10. For example, context at information handling system 10 is sensed by one or more ambient light sensors, accelerometers, cameras, Doppler motion sensors, and/or Hall sensors that detect rotational orientation of hinge assembly 22. In the example embodiment, a multimedia control panel is presented at hinge display 26 as an extended user interface of an operating system of portable information handling system 10. Having the multimedia controls presented on hinge display 26 leaves display 24 dedicated to presenting the multimedia content while control is managed without interruption of the content. For instance, the operating system accepts control inputs with touches detected at hinge display 26. Alternatively, while hinge display 26 operates as an extended user interface of the operating system, cursor inputs at touchpad 20 or a mouse controls a cursor over hinge display 26 to accept end user inputs similar to the manner such inputs are processed by the operating system at display 24.

In part, hinge display 26 presents visual images selected based upon the closed or open state of main housing 12 and lid housing 14. In the closed state, the type of user interface may depend on whether an operating system is running on information handling system 10, such as over a central processing unit, or a lower power processor is managing information handling system 10, such as an embedded controller. In either mode, the user interface presented at hinge display 26 may be selected from different available modes based on context, such as task mode, a leisure mode and a gaming mode. For instance, with an operating system disabled, preset user interfaces stored in flash memory may be presented based upon commands generated at an embedded controller that fill in extra information, such as messages received or time of day. If instead a user has slept the operating system during execution of a gaming application, hinge display 26 may present messages related to gaming events received in background, such as events from a game detected through a wireless communication. When the system is idle, hinge display 26 may create visual effects to enhance system identification, such as by generating a user icon or color effect to help a user select the system from among other systems, such as in an education environment. For instance, hinge display 26 is wrapped about a polymer cylinder that illuminates to create a background effect under display 24, behind display 24 and visible from rear of lid housing 14 or under housing cover 16, such as glow of a color under the keys of keyboard 18. In one embodiment, feedback from sensors may enable active changes as hinge display 26 as the relative position of main housing 12 and lid housing 14 change orientation, such as changing the appearance of a manufacture logo as the angle of display 24 changes.

Figure 2:
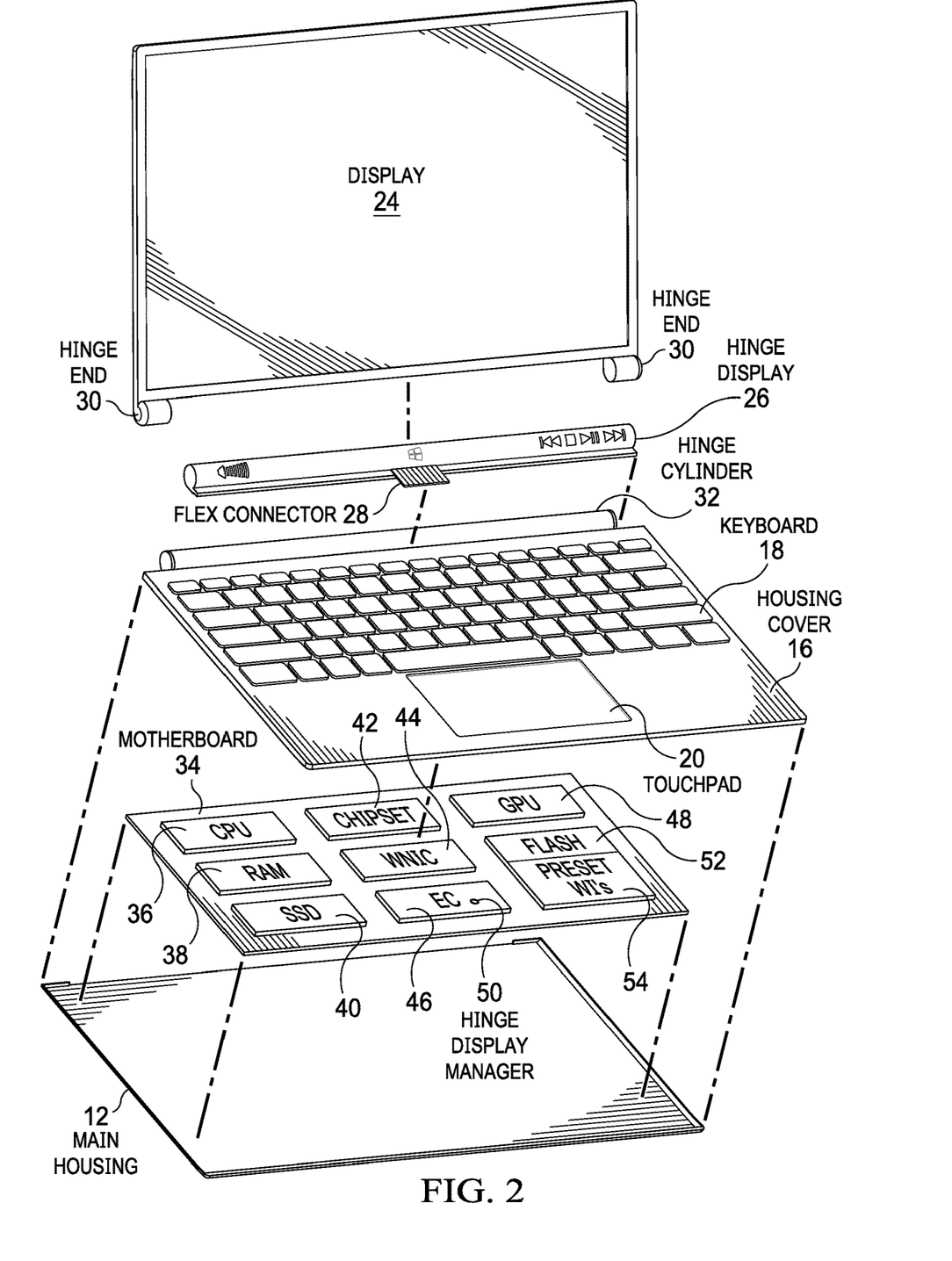
FIG. 2 depicts an exploded upper perspective view of processing components of the information handling system that cooperate to process information in various power states.

Referring now to FIG. 2, an exploded upper perspective view depicts processing components of information handling system 10 that cooperate to process information in various power states. In the example embodiment, hinge display 26 has a folded shape and flexible connector 28 that wrap around a hinge cylinder 32 coupled to housing cover 16 or main housing 12. Hinge cylinder 32 insert into hinge ends 30 at opposing sides of lid housing 14 to provide rotational movement of lid housing 14 relative to main housing 12. Flexible connector 28 interfaces with other processing components through a motherboard 34 disposed in main housing 12. For example, motherboard 34 interfaces a central processing unit (CPU) 36 that executes an operating system and applications stored in a random access memory (RAM) 38. A solid state drive (SSD) 40 provides persistent non-transitory memory to store information during power down states, such as by storing the operating system and applications during power down for boot of information handling system 10. A chipset 42 supports operation of CPU 36, such as by managing clock speed, memory accesses and communications various communication links. A wireless network interface card (WNIC) 44 supports wireless communications, such as WiFi and Bluetooth. An embedded controller 46 manages operations on a physical layer, such as power management and interfaces with input/output (I/O) devices like keyboard 18 and touchscreens of display 24 and hinge display 28. A graphics processor unit (GPU) 48 processes information to generate pixel values that define visual images on display 24 and hinge display 28. A flash memory 52 provides non-transitory storage of firmware instructions and other information used by the processing components, such pre-boot code executed by embedded controller 46 to initiate an operating system stored on CPU 36. The processing components depicted by FIG. 2 provide an example of hardware elements that cooperate to manage presentation of visual images at hinge display 26, however, alternative embodiments may include various combinations of alternative processing components as known in the art.

In the example embodiment, hinge display 26 provides visual images based upon information received from GPU 48 and/or embedded controller 46. During normal power up operations, an operating system executing on CPU 36 executes to define visual images for presentation at display 24 and hinge display 26. For instance, the processor provides visual information to GPU 48, which further processes the visual information to generate pixel values for presentation at display 24 and hinge display 26. During a powered down or low power state, embedded controller 46 executes a hinge display manager 50 as firmware embedded code to define visual images for presentation at hinge display 26. For instance, flash memory 52 stores plural preset user interfaces 54 that define pixel values for presentation at hinge display 26. Hinge display manager 50 selects one or more of the preset user interfaces 54 and provides them to a timing controller of hinge display 26 that scans the pixel values for presentation. In the example embodiment, flash memory 52 is an Serial Peripheral Interface (SPI) flash memory device that stores preset user interfaces 54. In alternative embodiments, flash memory may be located at hinge display 26 so that embedded controller selects a preset user interface by sending the selection to a timing controller of hinge display 26, which reads the pixel values from its local flash memory. In addition, embedded controller 46 hinge display manager 50 receives touch inputs made at hinge display 26 to accept commands by end user touches. In a power up state, the touch inputs are forwarded to the operating system. In a power down or low power state, embedded controller 46 may perform actions in response to a touch input, such as powering up information handling system 10, or may apply the input to change the preset user interface, such as selecting a different preset user interface for presentation. In one alternative embodiment, an operating system may access flash memory 52 to store preset user interfaces for presentation after power down. For instance, a game application may leverage the operating system to store a game user interface before power down so that the end user continues to see the game interface after power down. For instance, the game may store an idle preset user interface that is presented at power down and an event preset user interface that the embedded controller presents after power down when a message is received through a network interface. In that manner, the game alerts the end user when to reactivate portable information handling system 10.

Figure 3:
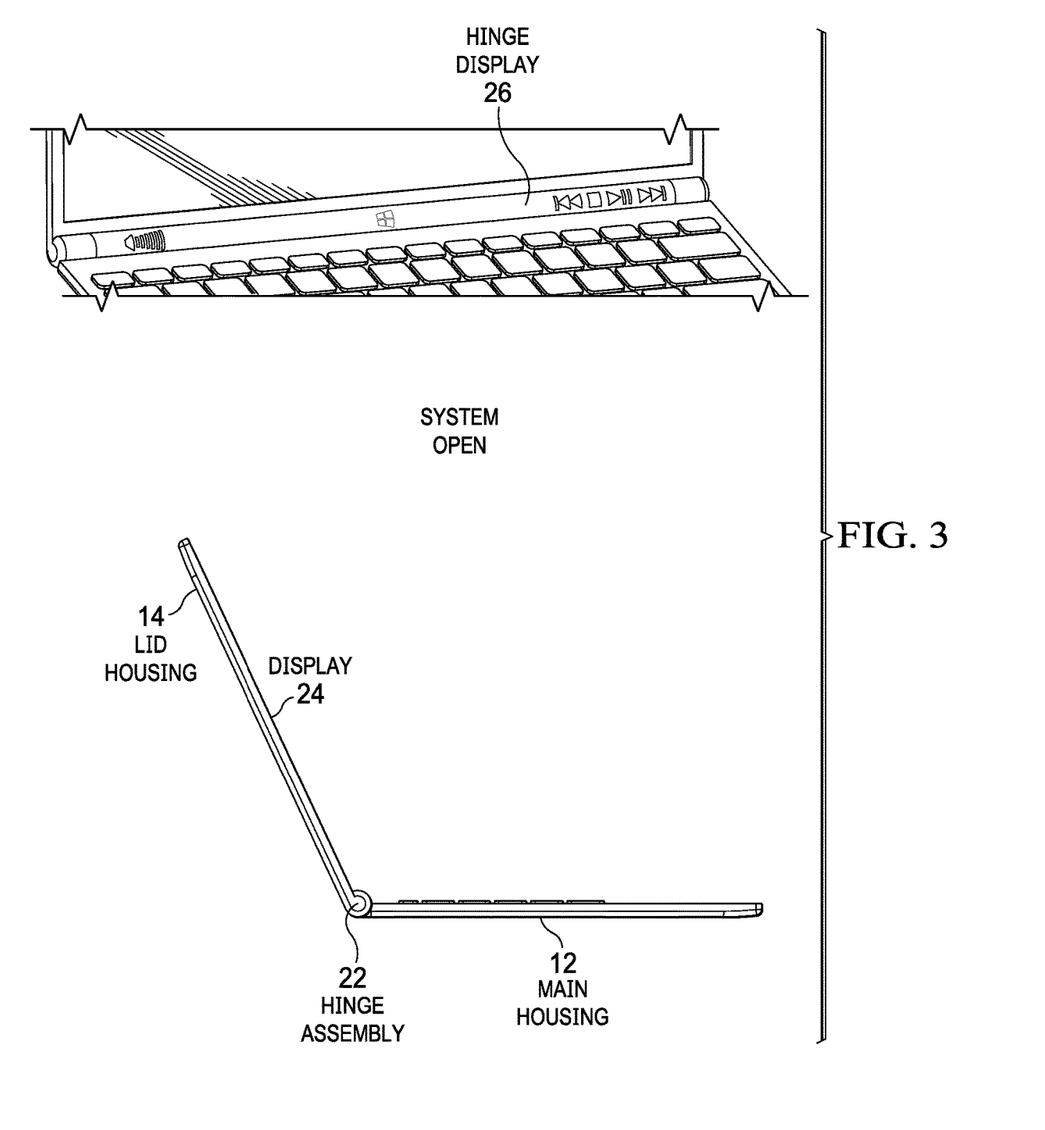
FIG. 3 depicts an example embodiment of an extended user interface with the information handling system in an open state.

Referring now to FIG. 3, an example embodiment depicts an extended user interface with the information handling system in an open state. In the example embodiment, lid housing 14 rotates substantially 90 degrees relative to main housing 12 so that display 24 is held in a viewing position. An end user interacting with portable information handling system 10 has a view of the front face of keyboard display 26 disposed over hinge assembly 22's outer surface, which has a cylinder shape. In the example embodiment, an operating system has presented a multimedia control user interface over hinge display 26 to control a multimedia player that is presenting multimedia content at display 24.

Figure 4:
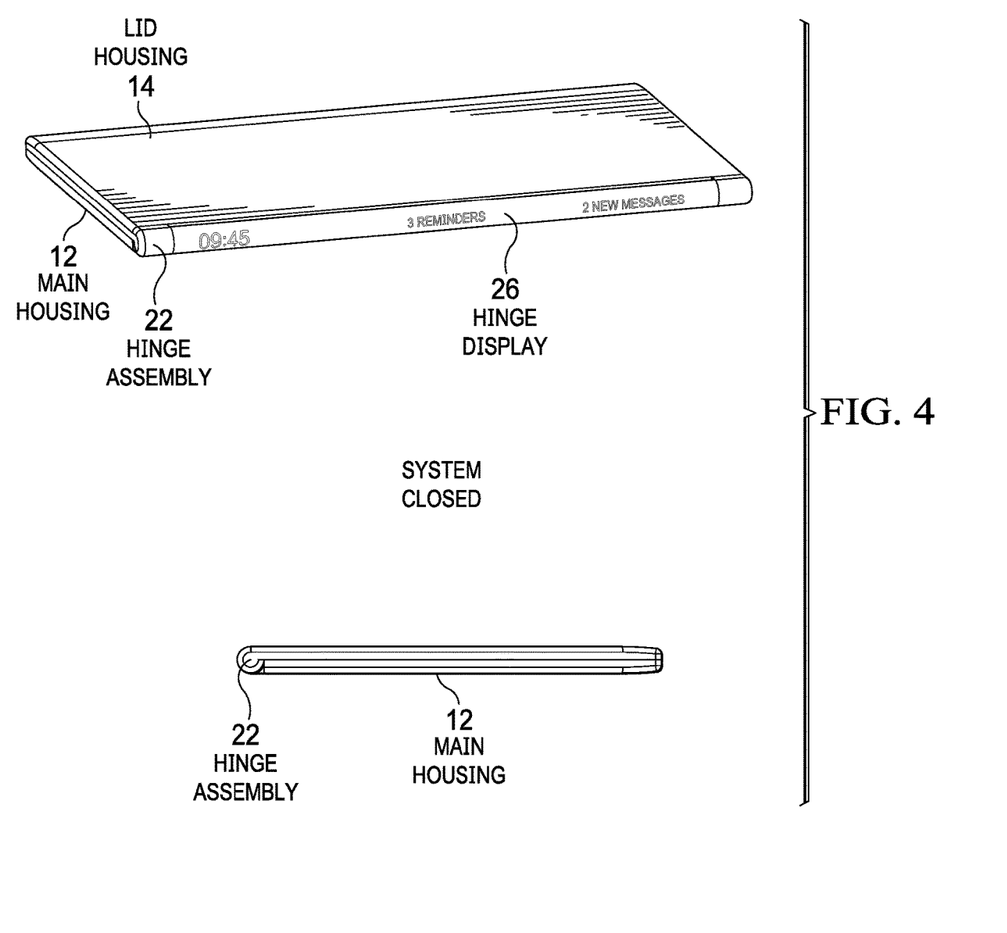
FIG. 4 depicts an example embodiment of a preset user interface with the information handling system in a closed state.

Referring now to FIG. 4, an example embodiment depicts a preset user interface with the information handling system 10 in a closed state. Lid housing 14 rotates over top of main housing 12 to close display 24 over keyboard 18. In the closed state, display 24 is not visible and the CPU is powered down so that embedded controller 46 manages presentation at hinge display 26. In alternative embodiments, CPU 36 may remain powered up in the closed position so that an operating system maintains control over visual images presented at hinge display 26. In the example embodiment, a preset user interface is commanded by hinge display manager 50 executing on embedded controller 46 to show time of day, a number of reminders and a number of new messages received through a network interface that is active in background. In the example embodiment, hinge display 26 remains stationary relative to main housing 12 as lid housing 14 rotates. In one embodiment, a hinge rotational orientation sensor provides main housing 12 and lid housing 14 rotational orientation to embedded controller 46 so that hinge display manager 50 knows what portions of hinge display 26 are visible based upon the position of lid housing portion 14 relate to main housing portion 12.

Figure 5:
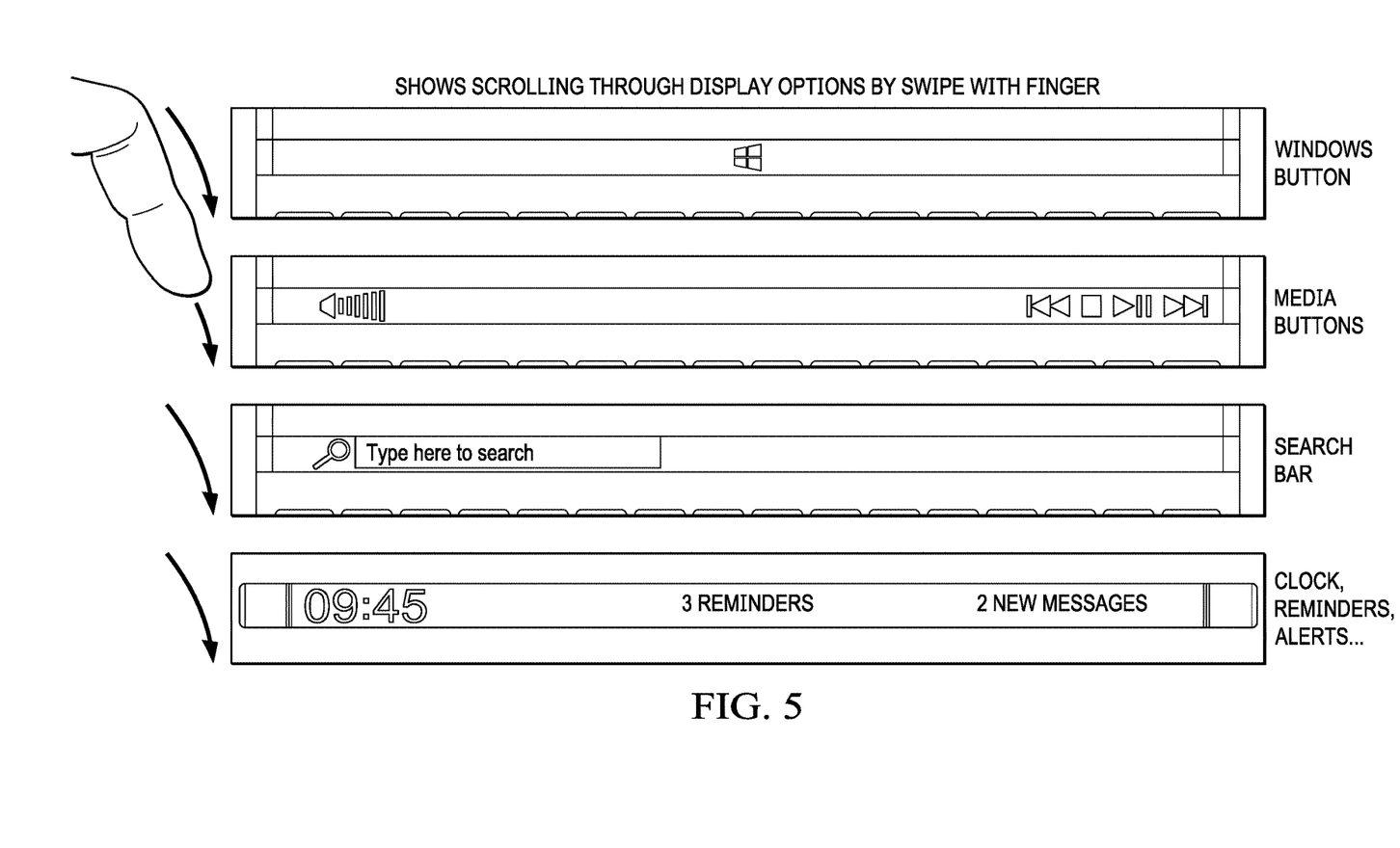
FIG. 5 depicts an example embodiment of plural types of preset user interfaces presented at a hinge display with a desired preset user interface selected by a touch flick at the hinge display.

Referring now to FIG. 5, an example embodiment depicts plural types of preset user interfaces presented at hinge display 26 with desired preset user interface selected by a touch flick at hinge display 26. In the example embodiment, the first preset user interface shows an operating system icon that indicates an idle state of portable information handling system 10, such as that no background processes are running. A flick at hinge display 26 selects as the next preset user interface a multimedia controller, such as that shows play, pause, rewind and other touch buttons to control a multimedia player. With the operating system off and the embedded controller managing a multimedia player, touches at the control buttons are forwarded to the multimedia device. Another flick at hinge display 26 selects a search bar user interface. A final flick at hinge display 26 selects a clock/reminder/messages user interface. During normal operations when the operating system does not use hinge display 26 as an extended display, preset user interfaces may be presented and cycled through as depicted by FIG. 5. In alternative embodiments, other types of user interfaces may be selected and presented with the operating system storing desired preset user interfaces in flash memory.

Figure 6:
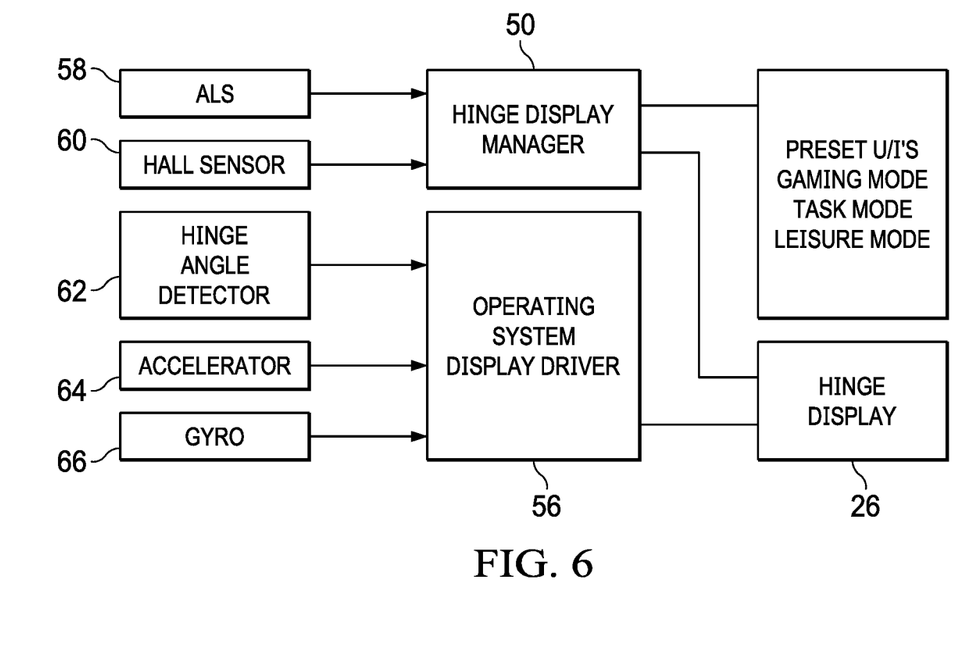
FIG. 6 depicts a block diagram of functional interactions of the hinge display manager.

Referring now to FIG. 6, a block diagram depicts functional interactions of hinge display manager 50. In the example embodiment, hinge display manager 50 interfaces with a variety of different sensors to determine a context at information handling system 10 and then selects a user interface for presentation at hinge display 26 based upon the context. One or more ambient light sensors 58 detect a level of ambient light at hinge display 26 and the main display 24 so that a comparison of the ambient light levels illustrate housing rotational orientation and viewing conditions. One or more Hall sensors 60 detect a relative position of main housing 12 and lid housing 14, such as to detect rotational orientation and/or a closed housing state. A hinge angle detector interfaced with hinge assembly 22 detects rotational orientation of main housing 12 and lid housing 14. Accelerometers 64 detect relative orientation of portable information handling system 10 and whether the system is stationary or moving. A gyroscope detects rotational movements, such as changes taking place to the main housing 12 and lid housing 14 orientations. In alternative embodiments, other sensors may include a camera, an infrared sensor, a microphone, etc. . . . Available sensed conditions are provided to embedded controller 46 for analysis by hinge display manager 50.

Hinge display manager 50 and an operating system display driver 56 analyze sensed conditions to define a context that determines the type of user interface presented at hinge display 26. If operating system display driver 56 is not available, such as due to a power down state, hinge display manager 50 selects a preset user interface available in flash memory and presents the preset user interface at hinge display 26. In the example embodiment, the preset user interfaces include three modes that hinge display manager 50 may select based upon context: a gaming mode associated with game applications, such as that rely upon network notifications for gaming events; a task mode associated with work applications, such as work scheduling or work email and messing applications; and a leisure mode associated with home use, such as home pictures and entertainment. As an example, hinge display manager 50 selects a work mode during work hours, a leisure mode when home WiFi network is detected, and a gaming mode when a gaming application was last active at portable information handling system 16.

When an operating system is active on portable information handling system 10, the operating system display driver may leverage preset user interfaces by activating hinge display manager 50 to operate as if the system is closed and in a power down state. Operating system display driver 56 may override embedded controller interactions entirely and simply treat hinge display 26 as an extended display area or a secondary display with full operating system interactions. In many situations, preset user interfaces will suffice for operating system interactions with more touch options available if a touch is made to hinge display 26. For instance, an end user touch to a multimedia controller with the lid housing 14 closed may be passed to a hardware element that is playing music without operating system involvement; however, with the operating system executing and lid housing 14 open, a touch a the multimedia control may alter the user interface at display 24 to provide the end user with additional interface options.

Although the present invention has been described in detail, it should be understood that various changes, substitutions and alterations can be made hereto without departing from the spirit and scope of the invention as defined by the appended claims.

What is claimed is:

1. A portable information handling system comprising:
first and second housing portions;
processing components disposed in at least one of the first and second housing portions, the processing components cooperating to process information, the processing components including a central processing unit operable to execute an operating system, a graphics processor operable to generate pixel values and an embedded controller operable to execute instructions with the operating system in a powered down state;
a display disposed in at least one of the first and second housing portions, the display interfaced with the processing components to present the information as visual images;
a hinge assembly rotationally coupling the first and second housing portions to rotate between a closed position and an open position, the hinge assembly having an outer surface;
a hinge display integrated in the hinge assembly outer surface, the hinge display aligned to present visual images in the closed and open positions; and
a hinge display manager executed on the embedded controller, interfaced with the hinge display and storing plural preset user interfaces for presentation at the hinge display based upon one or more predetermined conditions;
wherein the hinge display presents visual images provided by the hinge display manager when the operating system is in a powered down state; and
wherein the hinge display selectively presents the visual images provided by the hinge display manager and pixel values generated by the graphics processor based upon a selection by the operating system when the operating is in a powered up state.

2. The portable information handling system of claim 1 wherein the hinge assembly comprises a cylinder extending between opposing ends of the first and second housing portions.

3. The portable information handling system of claim 2 wherein the hinge display comprises an organic light emitting diode film disposed over the cylinder.

4. The portable information handling system of claim 2 wherein the hinge display comprises:
   a liquid crystal display panel folded over the cylinder; and
   a backlight integrated in the cylinder.

5. The portable information handling system of claim 1 further comprising a touch detection surface integrated with the hinge display and operable to detect touch inputs at the plural preset user interfaces.

6. The portable information handling system of claim 5 wherein the hinge display manager scrolls through the preset user interfaces based upon end user touches at the touch detection surface.

7. The portable information handling system of claim 6 wherein the embedded controller presenting the preset user interfaces when the first and second housing portions are in the closed position, the graphics processor presenting visual images when the first and second housing portions are in the open position.

8. The portable information handling system of claim 7 wherein the visual images presented by the graphics processor exclude the preset user interfaces.

9. The portable system of claim 1 wherein the preset user interfaces include:
   a gaming mode that indicates events associated with a gaming application;
   a task mode that indicates events associated with task applications; and
   a leisure mode that indicates events associated with leisure applications.

* * * * *